[19] United States Patent

Cuscurida

[11] 4,261,845
[45] Apr. 14, 1981

[54] NOVEL POLYUREAS AND THEIR USE AS GREASE THICKENING AGENTS

[75] Inventor: Michael Cuscurida, Austin, Tex.

[73] Assignee: Texaco Development Corporation, White Plains, N.Y.

[21] Appl. No.: 113,145

[22] Filed: Jan. 18, 1980

[51] Int. Cl.³ .................. C10M 5/20; C10M 5/12; C10M 7/30; C10M 7/32
[52] U.S. Cl. .................. 252/51.5 A; 564/50; 564/57; 564/59
[58] Field of Search .............. 252/51.5 A; 260/553 R, 260/553 A

[56] References Cited

U.S. PATENT DOCUMENTS

| | | | |
|---|---|---|---|
| 2,710,839 | 6/1955 | Swakon et al. | 252/51.5 A |
| 3,324,176 | 6/1967 | Kirschnek et al. | 260/553 R |
| 3,682,867 | 8/1972 | Shackelford et al. | 260/553 A |
| 3,704,321 | 11/1972 | Kmet et al. | 252/47.5 |
| 3,870,642 | 3/1975 | Gegner | 252/51.5 A |
| 3,879,305 | 4/1975 | Ehrlich | 252/47.5 |
| 4,046,797 | 9/1977 | Cross | 260/553 A |
| 4,110,309 | 8/1978 | Schulze et al. | 260/553 R |
| 4,115,360 | 9/1978 | Schulze et al. | 260/553 R |
| 4,115,446 | 9/1978 | Schulze | 260/553 R |
| 4,129,512 | 12/1978 | Kisselow et al. | 252/51.5 A |
| 4,154,724 | 5/1979 | Schulze | 260/553 R |
| 4,178,427 | 12/1979 | Waddill et al. | 260/553 R |

Primary Examiner—Andrew Metz
Assistant Examiner—Irving Vaughn
Attorney, Agent, or Firm—Carl G. Ries; Robert A. Kulason; Kenneth R. Priem

[57] ABSTRACT

Novel polyureas of the formula:

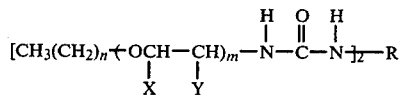

wherein n is 9 to 18, m is 2 to 10, X and Y are each either ethyl, methyl or a hydrogen atom and R=aromatic, aliphatic or cycloaliphatic, are described herein. These polyureas are particularly useful as thickening agents for lubricating oils to make greases. The polyureas may be prepared by reacting the aminated products of propoxylated fatty alcohols with organic polyisocyanates. The reaction is a simple process requiring no heat. Very low levels of the resulting polyureas are required to thicken oils of lubricating viscosity into greases which have good high temperature stability.

8 Claims, No Drawings

NOVEL POLYUREAS AND THEIR USE AS GREASE THICKENING AGENTS

BACKGROUND OF THE INVENTION

1. Field of the Invention

This invention relates to new and useful polyurea compounds including compositions and methods of using the compounds as grease thickening agents.

2. Description of the Prior Art

Prior art greases have generally comprised a petroleum hydrocarbon oil, refined mineral oil or synthetic ester in which thickening agents such as metal salts or soaps are used in such quantities as to give a final grease composition of the desired consistency. Most greases have been formulated with soaps, however, these soaps tend to catalyze the oxidation of the lubricant. Recently, U.S. Pat. No. 3,879,305 has described improved greases having a wide temperature utility and good oxidation stability which are much improved over the greases made using soaps. The greases of this patent were made using a lubricating oil and a thickening quantity of a polyurea made by reacting a monoamine, a diisocyanate and a diamine. The diamine used therein has one amino group attached to each of two hydrocarbyl groups separated by an oxygen or sulfur atom. The method of making the polyureas of U.S. Pat. No. 3,879,305 requires heating the reactants for approximately one hour prior to forming the grease.

U.S. Pat. No. 3,704,321 utilizes polyoxyalkylene bis-thioureas as extreme pressure lubricants in metal working fluids and, particularly, aqueous type fluids. Preparation of these bis-thioureas requires heating a polyether diamineisothiocyanate mixture for several hours. Further, German Offenlegungsschrift No. 2,604,342 describes the preparation of polyurea greases by the reaction of a monoamine, a diamine and a diisocyanate into a grease.

BRIEF SUMMARY OF THE INVENTION

The present invention concerns polyureas of the formula:

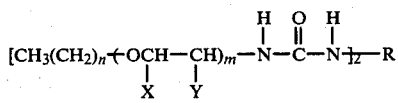

wherein n is 9 to 18, m is 2 to 10, X and Y are each either ethyl, methyl or a hydrogen atom and R is aromatic, aliphatic or cycloaliphatic. The polyureas are prepared by reacting an alkylpolyalkoxy monoamine with an organic polyisocyanate. A grease composition using these polyureas may be made by using an oil of a lubricating viscosity as a vehicle, and mixing into it the aminated product of propoxylated fatty alcohols (an alkylpolyalkoxy monoamine) with an organic polyisocyanate to form a thickening amount of polyurea described above.

DESCRIPTION OF THE PREFERRED EMBODIMENTS

Generally, the greases of this invention were prepared using a lubricating oil, a monoamine such as the aminated propylene oxide adduct of a fatty alcohol, and an organic polyisocyanate. This type of mixture gives greases with good high temperature properties. The method of making these greases is very simple and straight-forward which should increase production rates of these products. All that is required is a mixing of the component parts. No external heating is required to produce these greases which makes them preferable over the greases of the prior art because of their low energy requirements. Fewer components are required to make the greases of this invention than those of the prior art. Further, very low levels of the polyureas of this invention are required to thicken oils into greases satisfactorily.

Lubricating Oils

Lubricating oils, such as paraffinic or naphthalenic base stocks are suitable to be made into greases by the methods of this invention. Also, the polyureas of this invention should be useful for thickening of synthetic oils such as polyalkylene glycols, trimethylolpropane esters, pentaerythritol esters, dibutyl phthalate, fluorocarbons and silicones. Thus, the polyureas of the invention are expected to be useful as thickening agents in a wide variety of oils.

It has been found that solvent neutral oil 7 (SNO-7) works particularly well with the methods of this invention. SNO-7 is a furfural refined, solvent dewaxed hydrocarbon distillation cut which has a viscosity of 25 centistokes at 40° C. It was chosen for use in the experiments herein because it is representative of lubricating oils. Those skilled in the art could select other lubricating oils suitable for use with the methods of this invention.

Monoamines

The monoamines useful in making the polyureas of this invention have the general formula:

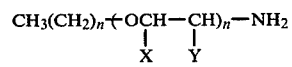

where n is 9 to 18, m is 2 to 10, X and Y are either ethyl, methyl or a hydrogen atom.

The preferred monoamines are prepared from aliphatic alcohols containing, preferably, 10 to 19 carbon atoms. The monoamines are prepared by alkoxylating (usually propoxylating or butoxylating) such alcohols with at least one mole of, preferably, propylene oxide to provide the precursor to the amine used in the preparation of the polyureas.

The alcohols are standard items of commerce derived from any of several processes including hydrogenation of acids or esters from natural fats, the so-called Ziegler alcohol process, the hydroformylation of olefins, or the oxidation of paraffins. While it is preferable that the alcohol be substantially linear in nature, some branching may be present in the alkyl portion of the molecule. The alkoxylation reaction is conducted by those methods well known to those skilled in the art by reacting the alcohol with propylene or butylene oxide or a mixture of these, preferably, propylene oxide in the presence of an acid or alkali catalyst, usually an alkaline material such as potassium hydroxide, for example. Enough alkoxide is added to give the desired number of alkoxy groups to the alcohol. After the reaction is concluded, the alkaline catalyst is neutralized with acid and a product recovered.

The alkoxylated alcohols are reacted with ammonia using a known method of reductive amination such as, for example, that described in U.S. Pat. No. 3,654,370 wherein the propylene oxide adduct of a polyhydric material is reacted with ammonia in the presence of a hydrogenation-dehydrogenation catalyst to form polyether monoamines, although diamines and higher amines may also be made by this process. The preferable catalyst for the reductive amination will be one containing nickel, copper and chromium as described, for example, in U.S. Pat. No. 3,152,998.

Other methods of reductive amination are known to those of ordinary skill in the art which are satisfactory to provide the monoamines required by this invention. The monoamines may also be made from thio organic compounds in the same manner that polyoxyalkylenepolyamines are made as described in U.S. Pat. No. 3,236,895.

Isocyanates

In turn, the organic polyisocyanates useful in making the polyureas of this invention by physical mixing with the monoamines have the general formula $R-N=C=O)_2$ where R is aromatic, aliphatic or cycloaliphatic. Specific isocyanates useful for the preparation of the polyureas include diisocyanates such as isophorone diisocyanate, hexamethylene diisocyanate and methylene bis(cyclohexylisocyanate) and polymeric isocyanates such as the polymethylene polyphenyl polyisocyanates having functionalities up to 2.7.

The preferred type of organic polyisocyanate is a methylene diphenyl diisocyanate modified to assume a liquid form. A specific example of a modified diisocyanate useful in making the polyurea thickening agents of this invention is ISONATE ® 143L which is a light-yellow 4,4'-modified diisocyanate having low viscosity manufactured by the Upjohn Company. ISONATE 143L is modified to assume a liquid form over a phosphorous catalyst.

Example V below shows that a polymeric isocyanate is also suitable for use in making the polyurea thickening agents of this invention. PAPI ® 901 is an aromatic polymeric isocyanate product of the Upjohn Company.

Further advantages of this invention and details of the methods of preparation will be demonstrated in the following examples.

EXAMPLE I

Into a one-pint wide-mouthed bottle were charged 270 g solvent neutral oil 7 (SNO-7) and 20.1 g JEFFAMINE ® M-300. JEFFAMINE M-300 is a polyalkoxyalkyl monoamine available from Jefferson Chemical Company prepared from linear alkyl alcohols by base catalyzed propoxylation and followed by Ni—Cu—Cr catalyzed reductive amination, with an average molecular weight of 300. After mixing, ISONATE ® 143L isocyanate (9.9 g) was slowly added to the SNO-7-JEFFAMINE M-300 mixture while stirring with a wooden spatula.

The mixture started to thicken immediately and was completely gelled by the time all of the ISONATE 143L had been added. The resultant product had the consistency of a thick grease. After heating this grease for 6 hours at 100° C., it retained its original consistency and did not melt or flow out.

EXAMPLE II

Using the procedure of Example I, a grease having the consistency of Vaseline was made by reaction of 294 g SNO-7, 4.05 g JEFFAMINE M-300 and 1.95 g ISONATE 143L. This grease did not melt or separate when heated 6 hours at 100° C.

EXAMPLE III

Using the procedure of Example I, a grease was prepared by reaction of 285 g SNO-7, 10.05 g JEFFAMINE M-300 and 4.95 g ISONATE 143L. This grease did not melt or separate when heated 6 hours at 100° C.

EXAMPLE IV

This example will illustrate the preparation of the polyurea greases of this invention using a high speed disperser (Dispersator) for mixing.

SNO-7 (600 g) and 20.8 g JEFFAMINE M-300 were charged into a one-quart metal can and well mixed. ISONATE 143L (10.7 g) was then added slowly to the oil-JEFFAMINE M-300 mixture while stirring vigorously with the Dispersator. The mixture quickly gelled into a grease with a very smooth consistency.

EXAMPLE V

Using the procedure of Example IV, a grease was prepared by reaction of 600 g SNO-7, 21.1 g JEFFAMINE M-300, and 10.4 g PAPI ® 901 polyisocyanate. The mixture quickly gelled into a grease with a smooth consistency.

EXAMPLE VI

Using the procedure of Example IV, a grease was prepared by reaction of 600 g SNO-7, 30.4 g JEFFAMINE M-300, and 9.6 g toluene diisocyanate. The mixture gelled quickly into a grease with a smooth consistency.

The next two examples show attempts at making greases from two of the monoamines mentioned in U.S. Pat. No. 3,879,305. Unlike the previous examples, Examples VII and VIII using alkyl monoamines did not make good greases, much less make greases with good temperature stability.

EXAMPLE VII

SNO-7 (600 g) and n-octylamine (14.1 g) were charged into a one-quart metal can and well mixed. ISONATE 143L (15.9 g) was then added slowly to the oil and n-octylamine mixture while stirring vigorously with a Dispersator. The mixture turned milky with some increase in viscosity but did not gel. It could readily be poured at room temperature.

EXAMPLE VIII

SNO-7 (600 g) was charged into a one-quart metal can and heated to 90°–100° C. Octadecylamine (19.5 g) was then charged into the hot SNO-7 and stirred until solubilized. The oil-octadecylamine mixture was then cooled to 26° C. ISONATE 143L (10.5 g) was slowly added to the oil-octadecylamine mixture while vigorously stirring with the Dispersator. The mixture increased in viscosity and turned into a very soft gel. It softened considerably after heating two hours at 100° C.

While a great advantage of this invention is that the greases can be prepared without heating, a temperature range of 77° to 150° C. could be used with satisfactory results.

Many modifications and variations of the invention as set forth herein may be made without departing from the spirit and scope thereof, and, therefore, only such limitations should be imposed as are indicated in the claims set out below.

I claim:
1. Polyureas of the formula:

$$[CH_3(CH_2)_n(OCH-CH)_m-\underset{\underset{X}{|}}{N}-\underset{}{\overset{O}{\overset{\|}{C}}}-\underset{\underset{Y}{|}}{N}]_2-R$$

wherein n is 9 to 18, m is 2 to 10, X and Y are each either ethyl, methyl or a hydrogen atom and R is aromatic, aliphatic or cycloaliphatic.

2. Polyureas of claim 1 in which n is 9 to 11, m is 2, X is hydrogen and Y is methyl.

3. A grease composition comprising an oil of lubricating viscosity, as a vehicle, and a thickening amount of a polyurea of claim 1 prepared by mixing an alkylpolyalkoxy monoamine with an organic polyisocyanate.

4. The grease composition of claim 3 wherein the alkylpolyalkoxy monoamine is of the formula:

$$CH_3(CH_2)_n(OCH-CH)_m-NH_2$$
$$\phantom{CH_3(CH_2)_n(O}\underset{X}{|}\phantom{CH-}\underset{Y}{|}$$

wherein n is 9 to 18, m is 2 to 10, and X or Y being methyl and the other being a hydrogen atom.

5. The grease composition of claim 3 wherein the organic polyisocyanate is of the formula:

$$R(N=C=O)_2$$

wherein R is aromatic, aliphatic or cycloaliphatic.

6. The grease composition of claim 3 wherein the mixing of the monoamine and the polyisocyanate is conducted at ambient temperatures.

7. The grease composition of claim 4 wherein the monoamine n is 9 to 11, m is 2, X is a hydrogen atom and Y is methyl.

8. The grease composition of claim 5 wherein for the organic polyisocyanate R is aliphatic.

* * * * *